(12) United States Patent
Gonring (10) Patent No.: US 12,438,388 B1
(45) Date of Patent: *Oct. 7, 2025

(54) VARIABLE VOLTAGE CHARGING SYSTEM AND METHOD FOR A VEHICLE

(71) Applicant: Brunswick Corporation, Mettawa, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,755

(22) Filed: Apr. 12, 2024

Related U.S. Application Data (63) Continuation of application No. 17/831,196, filed on Jun. 2, 2022, now Pat. No. 12,003,133, which is a
(Continued)

(51) Int. Cl.
*H02J 7/14* (2006.01)
*B60R 16/033* (2006.01)
(Continued)

(52) U.S. Cl.
CPC .............. *H02J 7/14* (2013.01); *B60R 16/033* (2013.01); *F02B 63/042* (2013.01); *F02D 29/06* (2013.01);
(Continued)

(58) Field of Classification Search
CPC ........ H02J 7/14; B60R 16/033; F02B 63/042; F02D 29/06; F02D 2200/101; F02N 11/0862
See application file for complete search history.

(56) References Cited

U.S. PATENT DOCUMENTS

| | | | |
|---|---|---|---|
| 4,405,892 | A | 9/1983 | Staerzl |
| 5,418,401 | A | 5/1995 | Kaneyuki |

(Continued)

FOREIGN PATENT DOCUMENTS

| | | |
|---|---|---|
| CN | 105539155 | 5/2016 |
| CN | 206211901 | 5/2017 |

(Continued)

OTHER PUBLICATIONS

European search report mailed Apr. 13, 2021 in counterpart European Patent Application 20213830.1.
(Continued)

*Primary Examiner* — Carlos Amaya
(74) *Attorney, Agent, or Firm* — Andrus Intellectual Property Law, LLP (57) ABSTRACT

A charging system for a vehicle includes an alternator configured to alternately output at least a low charge voltage to charge a low voltage storage device and a high charge voltage to charge a high voltage storage device, and a switch configured to switch between at least a first switch position connecting the alternator to the low voltage storage device and a second switch position connecting the alternator to the high voltage storage device. A controller is configured to control operation of the alternator and the switch between at least a low voltage mode and a high voltage mode based on at least one of an engine RPM and a temperature. In the low voltage mode the alternator outputs the low charge voltage and the switch is in the first switch position and in the high voltage mode the alternator outputs the high charge voltage and the switch is in the second switch position.

21 Claims, 8 Drawing Sheets

Related U.S. Application Data continuation of application No. 16/723,243, filed on Dec. 20, 2019, now Pat. No. 11,381,103.

(51) Int. Cl.
  *F02B 63/04* (2006.01)
  *F02D 29/06* (2006.01)
  *F02N 11/08* (2006.01)

(52) U.S. Cl.
  CPC .... *F02N 11/0862* (2013.01); *F02D 2200/101* (2013.01)

(56) References Cited

U.S. PATENT DOCUMENTS

| | | | |
|---|---|---|---|
| 5,448,152 A | 9/1995 | Albright | |
| 5,896,022 A | 4/1999 | Jacobs, Sr. | |
| 5,963,013 A | 10/1999 | Watson et al. | |
| 6,057,666 A | 5/2000 | Dougherty et al. | |
| 6,215,277 B1 * | 4/2001 | Renehan | H02J 7/1423 320/117 |
| 6,342,775 B1 | 1/2002 | Sleder, Sr. | |
| 6,652,330 B1 | 11/2003 | Wailewski | |
| 6,857,917 B1 | 2/2005 | Wasilewski | |
| 7,218,118 B1 | 5/2007 | Gonring | |
| 8,043,132 B1 | 10/2011 | Wyant | |
| 9,054,555 B1 | 6/2015 | Ward | |
| 9,337,683 B2 | 5/2016 | Phillips et al. | |
| 9,543,874 B2 | 1/2017 | Hakeem et al. | |
| 9,545,916 B2 | 1/2017 | Kamatani et al. | |
| 9,669,780 B2 | 6/2017 | Ambrosio et al. | |
| 9,975,619 B1 | 5/2018 | Gonring | |
| 10,097,125 B2 | 10/2018 | Zook et al. | |
| 12,003,133 B1 * | 6/2024 | Gonring | F02B 63/042 |
| 2004/0164703 A1 | 8/2004 | Berels | |
| 2008/0215199 A1 | 9/2008 | Aoyama et al. | |
| 2009/0243554 A1 | 10/2009 | Gu et al. | |
| 2012/0013310 A1 * | 1/2012 | Clark | H02P 9/10 322/17 |
| 2014/0375232 A1 | 12/2014 | Findeisen et al. | |
| 2017/0001585 A1 | 1/2017 | Fink | |
| 2017/0077853 A1 | 3/2017 | Zook et al. | |
| 2019/0052481 A1 | 2/2019 | Wu et al. | |
| 2019/0165710 A1 | 5/2019 | Judge et al. | |

FOREIGN PATENT DOCUMENTS

| | | |
|---|---|---|
| DE | 102008008561 | 8/2009 |
| EP | 1523083 | 4/2005 |
| JP | H05227752 A | 9/1999 |
| JP | 2001258174 | 9/2001 |
| JP | 2014005816 | 1/2014 |
| JP | 2015180140 | 10/2015 |
| JP | 2016220305 | 12/2016 |

OTHER PUBLICATIONS

Chinese Office Action for corresponding Chinese Application No. 202011523050.X, mailed Jan. 3, 2023, 3 pages.

Chinese Office Action for corresponding Chinese Application No. 202011523050.X, mailed Jul. 12, 2023, 8 pages.

Office Action in corresponding Chinese Patent No. 202011523050. X, Variable Voltage Charing System and Method for a Vehicle, dated Nov. 30, 2023, 8 pages.

EP Search Report for corresponding European Application No. 23196272.1, dated Dec. 4, 2023.

Japanese Office Action mailed Oct. 22, 2024 in Japanese Application No. 2020-203442.

* cited by examiner

VARIABLE VOLTAGE CHARGING SYSTEM AND METHOD FOR A VEHICLE

CROSS REFERENCE TO RELATED APPLICATION

This application is a continuation of U.S. patent application Ser. No. 17/831,196, filed Jun. 2, 2022, which is a continuation of U.S. patent application Ser. No. 16/723,243, filed Dec. 20, 2019, all of which applications are incorporated herein by reference in their entirety.

FIELD

The present disclosure generally relates to charging systems and methods for vehicles, and more particularly to engine alternator systems and charging control methods for charging vehicle batteries.

BACKGROUND

The following U.S. Patents are incorporated herein by reference, each in its entirety:

U.S. Pat. No. 5,448,152 discloses a battery management system maintains a charge on at least one auxiliary battery by switching the auxiliary battery automatically into parallel with the main battery charging circuit or with the auxiliary load. The system uses the AC component of the charging signal of a vehicle or boat charging system to trigger switching circuits coupled to operate relays or similar switching means which couple the auxiliary battery to the main charging circuit. When no charging signal is present, i.e., when the vehicle or boat engine is turned off, the auxiliary battery is switched automatically out of the charging system and is charged and in condition for use. A delay circuit can be provided for providing non-shorting operation, especially for use with more than one auxiliary battery in which batteries are charged in parallel and loaded in series, whereby the combined series voltage of the auxiliary batteries would exceed the vehicle or boat supply voltage. The timing circuits open the circuit from the auxiliary batteries to the vehicle or boat charging system prior to switching the batteries into a series configuration for use with a load requiring a voltage higher than the rated voltage of the charging system. The timing circuits thereby prevent momentary large currents upon changes of state.

U.S. Pat. No. 5,896,022 discloses a modification kit for the addition of an auxiliary battery charge management system for a marine or land vehicle having a starting battery and an auxiliary battery system. The kit includes a single pole breaker, a normally-on relay, and a two-way toggle switch. The single pole breaker is inserted in a circuit of the auxiliary battery system, and the normally-on relay and the toggle switch are inserted in the starting battery circuit of the vehicle to provide a dual mode charging system adapted to manual and automatic power regeneration of the starting battery and the auxiliary battery system.

U.S. Pat. No. 7,218,118 discloses a method for monitoring the condition of a battery of a marine propulsion system that provides the measuring of a voltage characteristic of the battery, comparing the voltage characteristic to a preselected threshold value, and evaluating the condition of the battery as a function of the relative magnitudes of the voltage characteristic and the threshold value. The voltage characteristic of the battery is measured subsequent to a connection event when a connection relationship between the battery and an electrical load is changed. The electrical load is typically a starter motor which is connected in torque transmitting relation with an internal combustion engine. The voltage characteristic is preferably measured at its minimum value during the inrush current episode immediately prior to cranking the internal combustion engine shaft to start the engine.

U.S. Pat. No. 9,054,555 discloses systems and methods for charging a rechargeable battery device on a marine vessel utilizing a rechargeable battery device, a charger charging the battery device, and a control circuit. The control circuit calculates an amount of current that is available to charge the battery device based upon an amount of current that is available from the shore power source and an amount of current that is being drawn from the shore power source by devices other than a voltage charger and limits the amount of current being drawn by the voltage charger to charge the battery device to an amount that is equal to or less than the calculated amount of current that is available to charge the battery device. The control circuit can repeatedly calculate the amount of current that is available to charge the battery device and limit the amount of current being drawn by a voltage charger to charge the battery device to thereby actively adjust an amount of charge applied to the battery device.

U.S. Pat. No. 10,097,125 discloses an alternator configured for use in a vehicle that includes a housing, a stator located within the housing, a field coil, a regulator, and a transceiver. The field coil is positioned in proximity to the stator and is configured for rotation relative to the stator. The regulator is electrically connected to the field coil and is configured to supply the field coil with an electrical signal based on a control signal. The transceiver is electrically connected to the regulator and is configured to wirelessly receive the control signal from an engine control module of the vehicle and to transmit the control signal to the regulator.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The disclosure relates to vehicle charging systems and methods configured to provide at least two different charge voltage outputs to charge different power storage devices on the vehicle. In one embodiment, a variable voltage charging system for a vehicle includes an alternator configured to generate electric power from a rotation output of an engine, wherein the alternator is configured to alternately output at least a low charge voltage to charge a low voltage storage device and a high charge voltage to charge a high voltage storage device. A switch is configured to switch between at least a first switch position connecting the alternator to the low voltage storage device and a second switch position connecting the alternator to the high voltage storage device. A controller is configured to control operation of the alternator and the switch between at least a low voltage mode and a high voltage mode. In the low voltage mode, the alternator outputs the low charge voltage and the switch is in the first switch position connecting the alternator to the low voltage storage device. In the high voltage mode, the alternator outputs the high charge voltage and the switch is in the second switch position connecting the alternator to the high voltage storage device.

A variable voltage charging system on a vehicle may be controlled to alternately charge a low voltage storage device and a high voltage storage device. The variable voltage charging system includes an alternator configured to alternately output at least a low charge voltage to charge the low voltage storage device and a high charge voltage to charge the high voltage storage device, and a switch configured to alternately connect the alternator to the low voltage storage device or the high voltage storage device. One embodiment of the control method includes operating the alternator and the switch in a low voltage storage mode to charge the low voltage storage device. Upon identifying a high voltage mode condition, the switch position is changed so as to connect to the high voltage storage device and a regulation setpoint of the alternator is changed from a low voltage setpoint to a high voltage setpoint. The alternator is then operated in the high voltage mode to output the high charge voltage to charge the high voltage storage device. When operating in the high voltage mode, a low voltage mode condition may be identified, and the system may then be reverted back to the low voltage mode.

In accordance with another aspect of the present disclosure, a method is provided for deterring the theft of a marine battery pack that is used to power a marine propulsion device, such as but not limited to an electric outboard motor. The marine battery pack is provided and includes an internal communication system that communicates both within the battery pack and externally from the battery pack. The battery pack communicates an authentication request from the battery pack. The authentication request is received by an authentication device that is located remotely from the marine battery pack. The authentication device receives the authentication request and determines whether the battery pack is properly associated with the authentication device.

If the battery pack is properly associated with the authentication device, the authentication device transmits a confirmation back to the marine battery pack. When the marine battery pack receives the confirmation of proper authentication, the marine battery pack operates in a normal operating state or condition. If the battery pack does not receive a confirmation back from an authentication device, the operation of the battery pack is modified away from the normal operating state or condition. It is contemplated that the modification to the operation of the marine battery pack would be significant enough to deter theft of the marine battery pack.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The present inventor has recognized that 12 volt power systems are insufficient for some vehicle applications, particularly for marine vessels and recreational vehicles having amenities that have significant power needs and require relatively large energy stores. For example, the inventor has recognized that a 48 volt battery system is advantageous for powering house loads on such vehicles, for example, because it allows the use of smaller wire to transmit power to the various elements on the vehicle. For instance, the house load may include cabin lights, an air conditioner, appliances, and the like in the cabin of the vehicle. This results in a more efficient and compact unit, and also allows for more discrete wiring throughout the vessel. Additionally, 48 volt systems produce less heat and thus are more efficient because less energy is converted to heat rather than electrical power. Moreover, higher voltage alternators, such as 48 volt alternators, have a higher max charging output, primarily because the current level can be reduced and thus a smaller wire can be used without losing too much power to heat.

However, the inventor has also recognized that use of 48 volt, or similar higher voltage power systems can be problematic when the battery charging is provided by an alternator connected to the vehicle engine. This is because 48 volt systems do not provide sufficient battery charging at low engine speeds. In particular, alternators providing 48 volt charging output have cut in speeds that are above the idle speed of most engines. Cut in speed is the speed at which the alternator begins to provide charging output. 48 volt alternators have a higher cut in speed because the alternator needs higher RPM to produce 48 volts than it does to produce a lower voltage, such as 12 volts. Thus, high voltage alternators, such as 48 volt alternators, do not provide a charging output at low speeds, such as at idle. Since significant operation time on many vehicles is spent at idle engine speeds, this inability to charge at low engine speeds has a significant impact on the usefulness and viability of such high voltage charging systems.

Figure 4A:
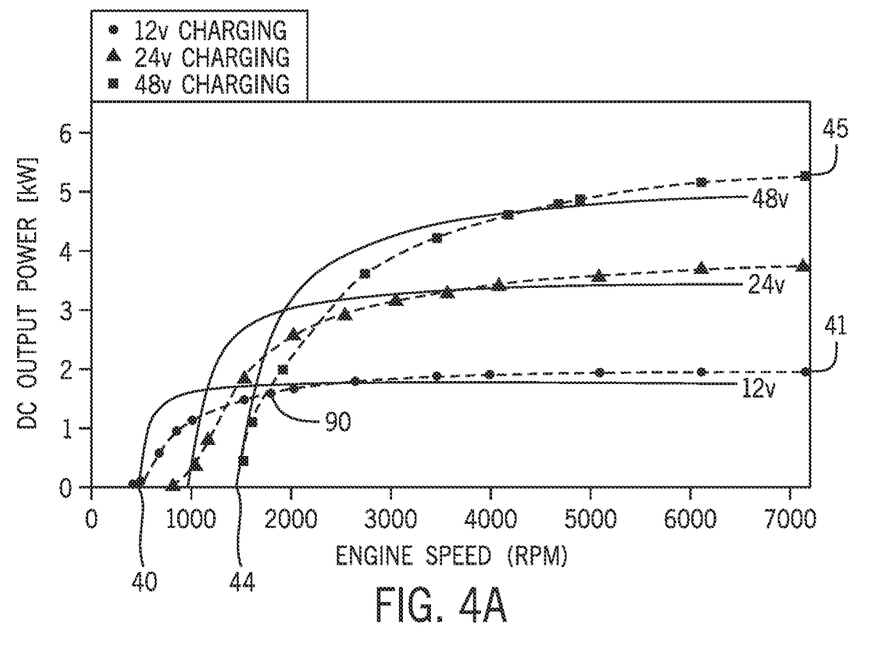
FIG. 4A is a graph depicting charging output power at various engine speeds.

While 12 volt systems provide good cut in speeds, and thus provide good charging output at lower engine RPMs, 12 volt alternators are large and heavy and wiring for 12 volt systems is bulky. FIG. 4A depicts the relationship between cut in speed and max output comparing 12 volt and 48 volt systems. The graph represents an alternator output at three different output voltage levels. For example, the graph may represent power output of a variable voltage alternator running at three different output voltages, including at a 12 volt charging output, a 24 volt charging output, and a 48 volt charging output. As illustrated in the graph, 48 volt systems have a higher maximum power output than lower voltage systems, including 12 volts systems, at higher engine speeds. However, 48 volt alternators have a much higher cut in speed where output is initiated. In this example, the cut in speed 40 for the 12 volt alternator is around 500 RPM, compared to the cut in speed 44 for the 48 volt alternator which is above 1500 RPM and well above idle speed of the exemplary marine engine in this particular example. However, the maximum power output 45 of the 48 volt alternator in this example is over three times greater than the maximum power output 41 of the 12 volt alternator.

In view of the above described recognition of the problems and benefits of low voltage versus high voltage power systems, the inventor endeavored to provide a variable voltage system combining the low cut in speed benefits of 12 volt systems and the high max power output benefit of higher voltage systems, such as a 48 volt system. While systems do exist that utilize two alternators on the same engine, one running at 12 volts and the other running at 48 volts, the inventor has recognized that such systems are not ideal for many vehicle applications where there is insufficient room for connection of two separate alternators to an engine. Thus, the inventor developed the disclosed system and method for allowing the same alternator to function in both a 12 volt system and a 48 volt system, and thus to utilize the strengths of both. Namely, at low engine speeds and other low voltage mode conditions described herein, the alternator operates in a low charge voltage output mode and is connected to a low voltage storage device, such as a 12 volt lead acid battery. At higher engine speeds above an engine speed threshold, the alternator operates in a high voltage mode in order to provide a high charge voltage to charge a high voltage storage device, such as a 48 volt battery, series of four 12 volt batteries, or two 24 volt batteries. This allows the system to take advantage of the high maximum charge output 45 of the higher voltage system, such as the 48 volt system, as well as to provide smaller and simpler wiring throughout the vehicle, such as throughout the marine vessel or recreational vehicle.

Typically, alternators designed for 48 volt are not compatible with 12 volt systems because they contain smaller wires which cannot handle the current generated for charging a 12 volt battery, particularly the current levels generated by the alternator at high engine speeds. In particular, alternators designed for high voltage outputs, such as 48 volts, have a stator comprised of smaller wire that can overheat at the high current levels generated in a 12 volt mode. Thus, operating a 48 volt alternator to charge a 12 volt battery will likely overheat the alternator, particularly if charging occurs at high engine speeds, or even lower engine speeds for an extended period of time. Accordingly, the disclosed system and method only operate the high-voltage-compatible alternator in the low voltage mode, such as providing charging output appropriate for a 12 volt battery, at low engine RPMs and otherwise provide current limiting functionality and/or temperature-based control that prevents overheating of their alternator in the low voltage mode.

Figure 1:
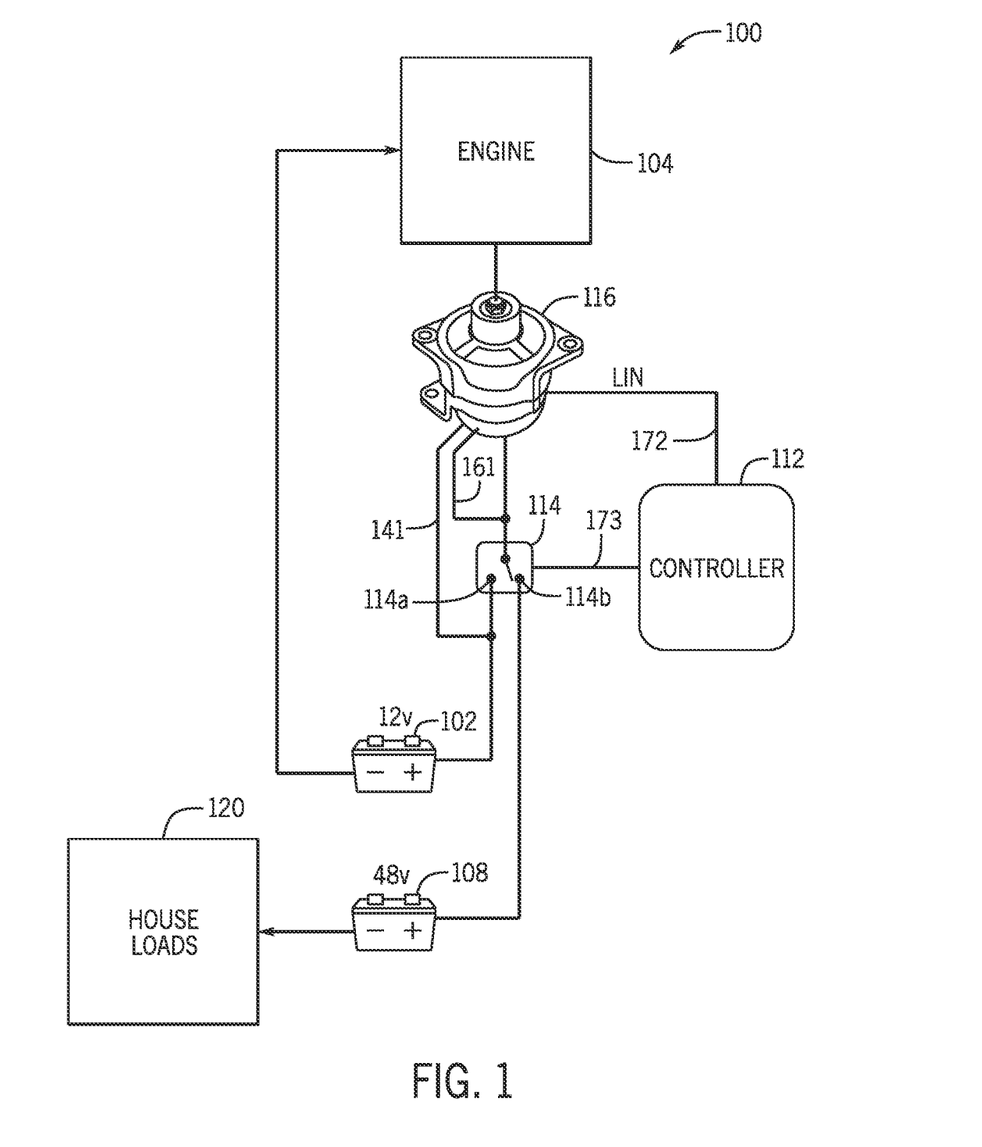
FIG. 1 schematically depicts a variable voltage charging system according to one embodiment of the present disclosure.
Figure 2:
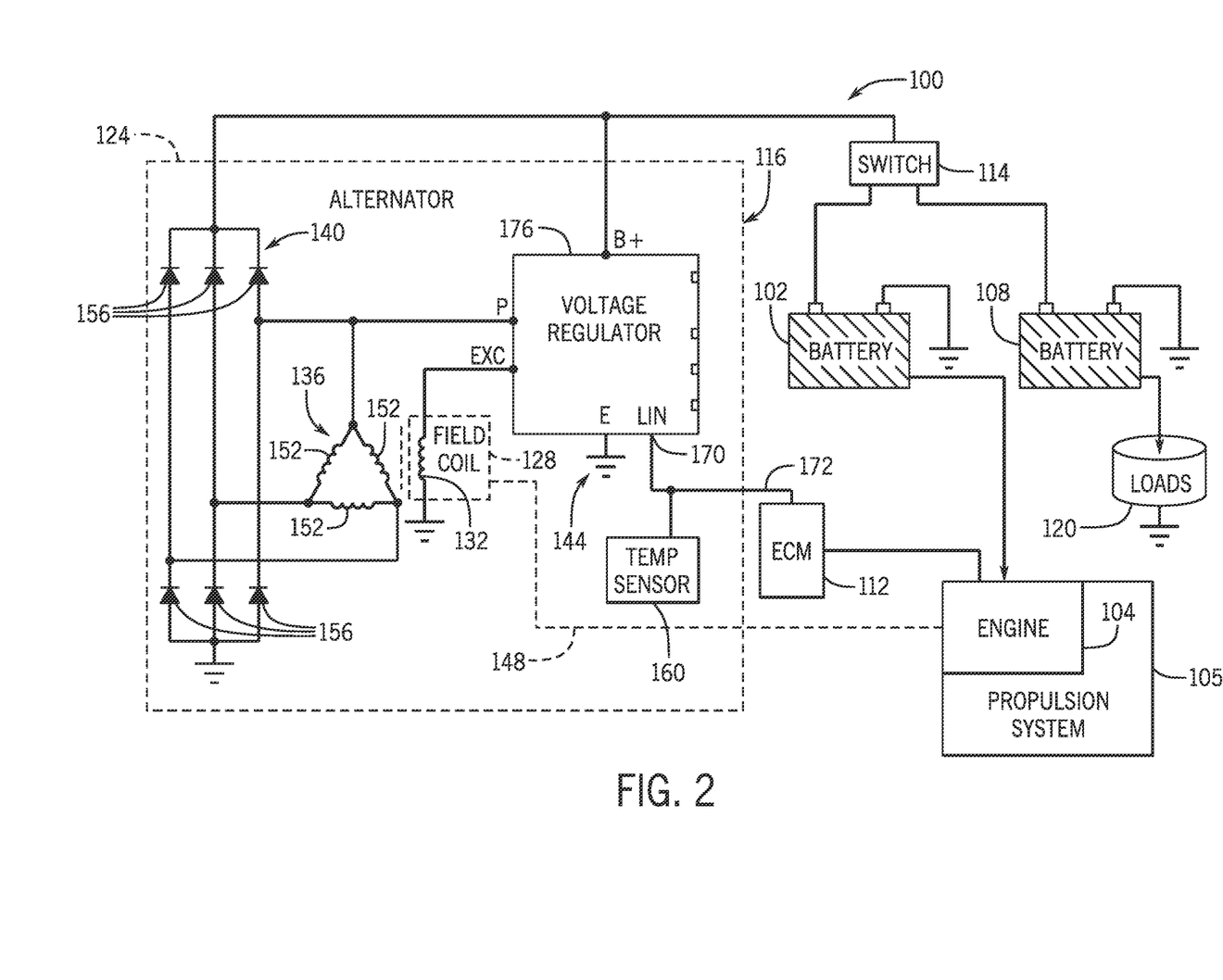
FIG. 2 depicts another embodiment of a variable voltage charging system according to the present disclosure.

FIGS. 1 and 2 demonstrate exemplary embodiments of a dual voltage charging system 100 having an alternator 116 that alternately connects to a low voltage storage device 102 and a high voltage storage device 108 through a switch 114, which may be a mechanical or solid state switch. In the depicted example, the low voltage storage device 102 is a 12 volt battery and the high voltage storage device 108 is a 48 volt battery. In other embodiments, the storage devices may be at other voltage levels where one is at a high voltage level than the other. Furthermore, the system may be used to switch between more than two voltage levels, such as between three voltage levels (e.g., 12 volts, 24 volts and 48 volts) or even more voltage levels. In the depicted example, the 12 volt battery powers the propulsion-related functions, such as ignition, steering, etc., and the 48 volt battery powers the house loads 120; however, other arrangements may be provided and within the scope of the present disclosure. For example, the 12 volt and 48 volt batteries may both be configured to power the house loads 120, with a converter in between.

The alternator 116 is configured to generate electric power from a rotation output of the engine 104, and provides a variable charging output capability such that it can be controlled to output at least two charging voltages. One exemplary alternator providing such capability is a 48 volt (or higher voltage output, such as 56 volts) LIN alternator. The alternator 116 is configured and controlled to alternately output a low charge voltage to charge the low voltage storage device 102 and a high charge voltage to charge the high voltage storage device 108.

The switch 114 is configured to switch between a first switch position 114a wherein it connects the alternator 116 to the low voltage storage device 102, and a second switch position 114b wherein it connects the alternator to the high voltage storage device 108. The switch may be a mechanical switch or a solid state switch controllable by a controller. The switch may reside outside or inside the alternator housing 124 (FIG. 2). A controller 112 is configured to control operation of the alternator 116 and switch 114 so as to change between a high voltage mode operation and a low voltage mode operation. In the high voltage mode, the alternator 116 outputs the high charge voltage and the switch connects the alternator 116 to the high voltage storage device 108. In the low voltage mode, the alternator 116 outputs the low charge voltage and the switch 114 connects the alternator 116 to the low voltage storage device. For example, where the high voltage storage device is a 48 volt battery the high charge voltage may be in the range of 53 to 56 volts, for example. Where the low voltage storage device is a 12 volt battery, the low charge voltage may be in the range of 14-14.5 volts, for example.

FIG. 2 depicts another embodiment of a variable voltage charging system 100, which includes an engine 104 and an electrical system comprising a low voltage storage device 102 and a high voltage storage device 108 connected to an electrical load 120 on the vehicle. The term "vehicle," as used herein, refers to any device configured to carry or to transport something or someone, including, without limitation, cars, trucks, buses, boats or other marine vehicles, recreational vehicles, trains, and planes. The term "engine," as used herein, includes any type of internal combustion engine suitable for powering the vehicle. The term "storage device," as used herein includes any type of battery suitable for supplying electrical energy to the vehicle and the engine.

The alternator assembly 116 includes a housing 124, a rotor 128 including a field coil 132 mounted thereon, a stator 136, a rectifier assembly 140, and a voltage regulator assembly 144. In the embodiment of FIG. 2, the rotor 128 is located at least partially within the housing 124 and is configured for rotation relative to the housing 124 and the stator 136. A coupling device 148, such as an endless belt, couples the rotor 128 to the rotational output of the engine 104.

The stator 136 is also located at least partially within the housing 124. The stator 136 is fixed in position with respect to the housing 124. The stator 136 typically includes a plurality of windings 152. As shown FIG. 2, the stator 136 includes at least three windings 152 and is referred to as a three-phase stator. The stator 136 is configured to output a three-phase AC signal in response to rotation of the rotor 128 by the engine 104.

The rectifier assembly 140 is a three-phase full-wave bridge rectifier, but in other embodiments is provided as any desired type of rectifier. The rectifier assembly 140 includes a plurality of diodes 156 electrically connected to the stator 136, the electrical load 120, the voltage regulator assembly 144, and the connected one of the storage devices 102, 108. The diodes 156 are configured to rectify the three-phase AC signal generated by the stator 136. The rectified signal (i.e. the output of the rectifier assembly 140) is typically a single-phase DC signal that is suitable for charging the storage devices 102, 108 and powering the load 120.

The controller 112 for controlling the variable voltage charging system 100, including the mode switching operation described herein, may be an engine control module (ECM) for the engine 104. Alternatively, the controller 112 may be a dedicated controller for the alternator 116, or may be some other control device, such as a propulsion control module, helm control module, etc. The controller 112 receives information from various sensors on the vehicle, including the temperature sensor 160 that senses a temperature of the alternator 116. The controller 112 may further receive information from a current sensor and/or a voltage sensor that sense the output of the alternator. For example, a wired connection 161 (FIG. 1) makes a connection from the output stud to an input on the voltage regulator to facilitate voltage sensing. The sensing is done inside the alternator and used as a reference for the voltage regulator to determine if more power or less power is needed to maintain the voltage setpoint. This wire could also go to the ECU, thereby providing information to the controller 112 indicating the voltage output of the alternator 116, for example such that the controller 112 can confirm that the transition has occurred to the commanded battery before ramping up the power. The controller 112 is configured to identify and command either the high voltage mode operation or the low voltage mode operation of the system 100.

The controller 112 controls the alternator 116 and the switch 114, such as via one or more communication links. In the depicted embodiment, the controller 112 communicates control commands to the alternator 116 via communication link 172, and communicates commands to the switch 114 via communication link 173. In various embodiments, the communication links 172 and 173 for communicating with the alternator 116 and the switch 114, respectively, may be the same or different communication means. The communication links 172, 173 may be physical links, such as wired data buses, or may be wireless links operating via any appropriate wireless protocol. For example, one or the other of the communication links 172, 173 may be via a local interconnect network (LIN) bus or via a controller area network (CAN) bus, such as a CAN Kingdom network. Alternatively, the switch 114 may be connected by a wire to ground inside the controller 112 to control the switch 114. Alternatively, the switch could reside inside the alternator.

In the depicted embodiment, the communication link 172 between the controller 112 and the alternator 116 is via a LIN bus. Additionally, one or more of the vehicle sensors may self-communicate with the controller 112 via LIN. The LIN communication protocol is a serial network protocol that is configured to operate with one master license and several slave devices. Thus, the controller 112 may be established as the master device, with the alternator 116 as a slave device. In this embodiment, the voltage regulator 176 communicates with the controller 112 via LIN bus 172 so as to control the alternator 116 in the high voltage mode and the low voltage mode. LIN voltage regulators are known and have a LIN terminal 170 configured to transmit and receive data according to the LIN communication protocol.

The voltage regulator 176 is configured to optimize the output voltage of this stator 136 (i.e., the output voltage of the alternator assembly 116), by adjusting the voltage supplied to the field coil 132. Alternatively or additionally, the voltage regulator 176 may be configured to control the excitation current of the stator 136 in order to control output and prevent the alternator from overheating. Additionally, the voltage regulator 176 may be configured to control a rate of change, or ramp up and ramp down, of the alternator charge output. This control functionality may be provided in response to instructions communicated to the voltage regulator 176, and particularly to the LIN terminal 170, by the controller 112. Control instructions for controlling the output voltage, excitation current, and ramp rate for the alternator 116 are established according to the LIN protocol.

The switch 114 switches between the low voltage storage device 102 and the high voltage storage device 108 so that both storage devices are charged by the system 100 at different times. The low voltage storage device 102 may be connected to the propulsion system 105, which includes the engine 104, in order to power the propulsion-related loads. For example, the low voltage storage device 102 may be a 12 voltage lead acid battery configured to power 12 volt loads relating to the propulsion system 105, including the engine starting, steering system, propulsion-related sensing system, etc., as is typical in many vehicle applications. The 12 volt battery 102 may also be configured to power other 12 volt loads on the vehicle. The high voltage storage device 108, such as a 48 volt battery or battery bank, may be configured to power corresponding 48 volt loads, such as a vehicle air conditioning system, appliances and other house loads.

Figure 3:
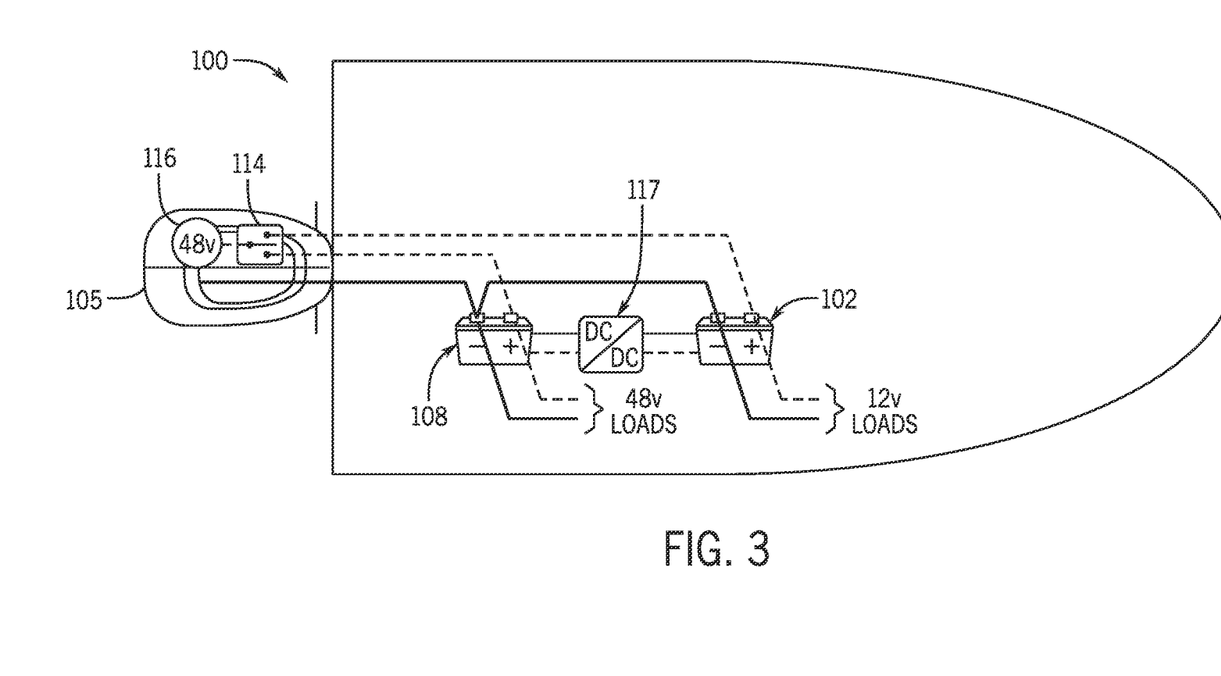
FIG. 3 depicts another embodiment of a variable voltage charging system for a marine vessel according to the present disclosure.

In other embodiments, a DC-DC converter may be provided between the low voltage storage device 102 and the high voltage storage device 108. FIG. 3 schematically depicts such an embodiment configured for a marine vessel. Here, the converter 117 connects the 48 volt battery 108 to the 12 volt battery 102 to enable power transfer there between. In such an embodiment, the converter 117 may be configured as a two way converter between the low voltage and high voltage levels so that power can be shared between the two systems. In the depicted example, the converter 117 allows power sharing between the 48 volt and 12 volt systems, where power generated at low engine speeds may be utilized by the 48 volt system and power generated by the 48 volt system may be utilized by the 12 volt system. Thereby, the converter 117 only needs to supply the average current rather than the peak, with the battery 108 as a buffer.

Figure 4B:
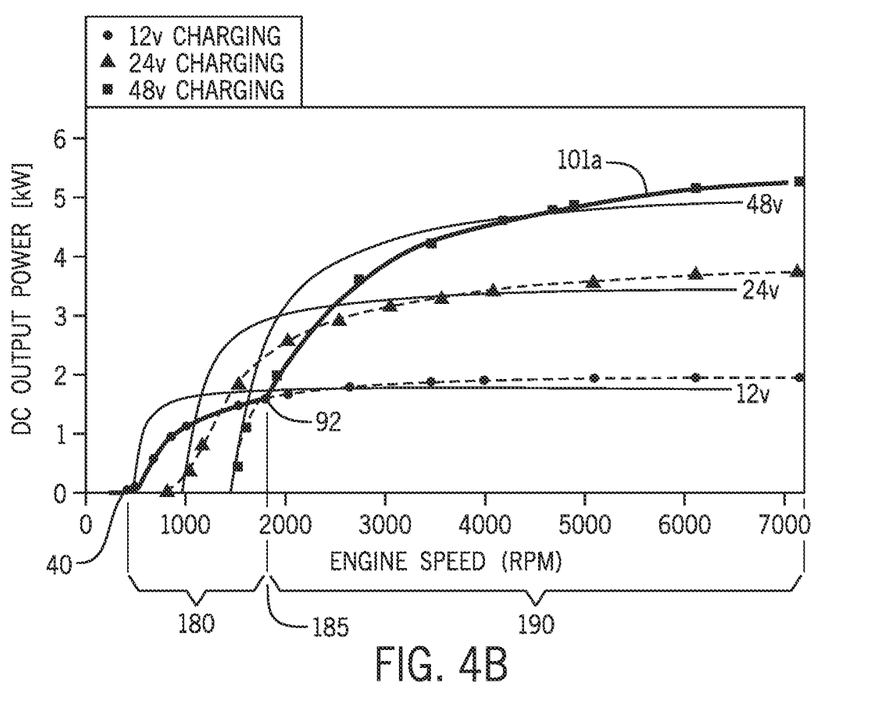
FIGS. 4B-4C are graphs depicting charging output power of exemplary embodiments of variable voltage charging systems at various engine speeds.
Figure 4C:
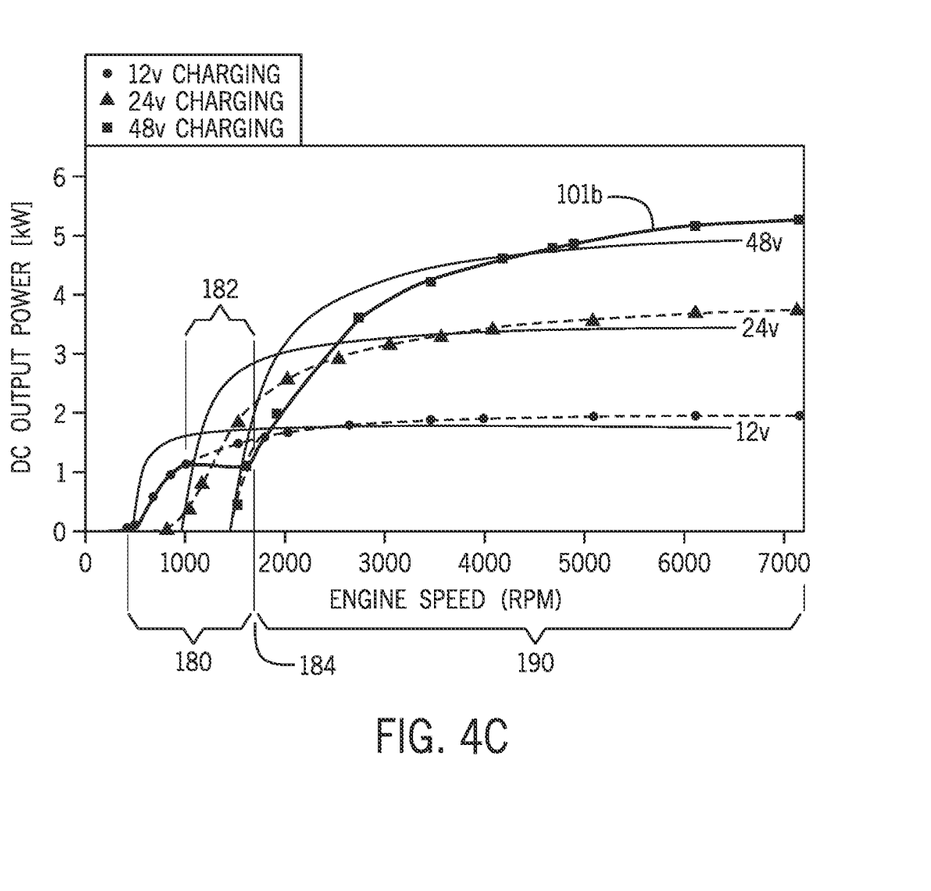

FIGS. 4B and 4C depict exemplary charging outputs of embodiments of the disclosed charging system 100. FIGS. 4B and 4C graphically depict exemplary charging output profiles 101 imposed on the graph of FIG. 4A depicting alternator outputs at three different voltage levels. In these examples, the system provides a low voltage charging output for charging a 12 volt battery and a high voltage charging output for charging a 48 volt battery. In other embodiments, the 24 volt alternator and storage device configuration may be utilized as either the high voltage system portion (paired with a 12 volt or other lower voltage system) or as the low voltage system portion (paired with the 48 volt or some other higher voltage system).

The depicted embodiment has benefits in that it utilizes the strength of both systems, including the low cut in speed of the 12 volt system and the high maximum charging output of the 48 volt system. Switching between the storage devices 102 and 108 for charging purposes is controlled by the controller 112 and performed based on engine speed and other factors, as described herein. FIG. 4B illustrates a charging profile 101a of one exemplary alternator configuration. In the example, the system switches between the low voltage charging function 180 and the high voltage charging function 190 at transition point 185, which is at the intersection point 92 of the 12 volt charge profile and the 48 volt charge profile. The transition point 185 between the low voltage mode 180 and the high voltage mode 190 may be based on engine RPM, alone or in conjunction with assessment of other factors such as alternator temperature, battery charge levels, etc. For example, a threshold RPM, which in the depicted embodiment is around 2000 RPM, may be established where the controller controls the alternator 116 and the switch 114 to switch between the low voltage mode 180 functionality to charge the low voltage storage device 102 and the high voltage mode 190 functionality to charge the high voltage storage device 108. For example, the controller 112 may communicate with the alternator 116 via LIN bus 172 to control the voltage output of the alternator 116 as appropriate for charging either the low voltage storage device 102 or the high voltage storage device 108.

In certain embodiments, the controller may also control the excitation current of the alternator, which may be particularly useful in the low voltage mode 180 in order to prevent overheating of the alternator 116 by reducing the field current in the stator 136. FIG. 4C depicts a charging output profile 101*b* wherein excitation current is limited. Excitation current of the alternator, and thus the alternator output, may be limited for a portion 182 of the low voltage mode 180, such as based on engine RPM. For example, the alternator 116 may be controlled in a limited output mode 182 to limit the max output of the alternator above, for example 1,000 RPM. Here, the transition point 184 may be set to a lower RPM than the above-described intersect 90, 92 in order to further limit the duration of operation in the low voltage mode 180 in order to prevent overheating. Alternatively or additionally, a time limit for operation in the low voltage mode 180 may be set to further prevent over heating of the alternator 116. In some embodiments, a temperature sensor 160 may be positioned to sense temperature of the alternator 116 and the alternator output may be controlled based thereon. For example, the temperature sensor 160 may be positioned within the alternator housing 124, such as to provide information regarding the temperature of the stator 136 so that overheating can be prevented. For example, if the temperature sensed by the temperature sensor 160 exceeds a high temperature threshold, then the controller 112 may change the operation of the alternator 116 to either reduce the excitation current even further or to switch to the high voltage mode 190 which will automatically reduce the current flowing in the stator 136.

Figure 5:
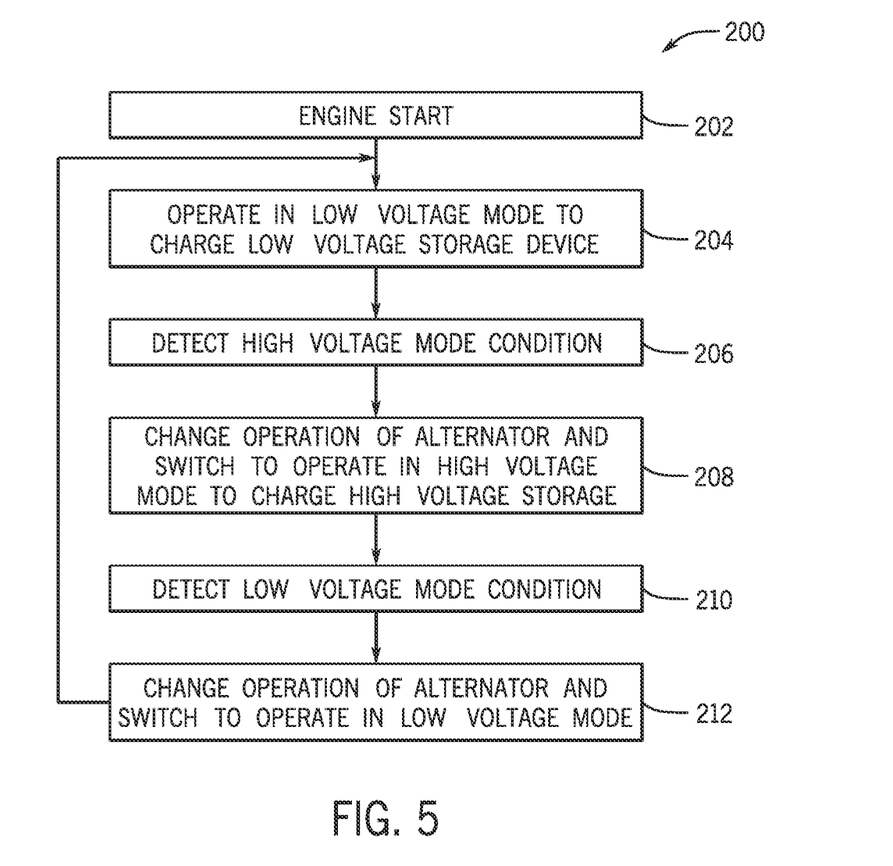
FIGS. 5-7 depict embodiments of methods of controlling a variable voltage charging system on a vehicle according to the present disclosure.
Figure 6:
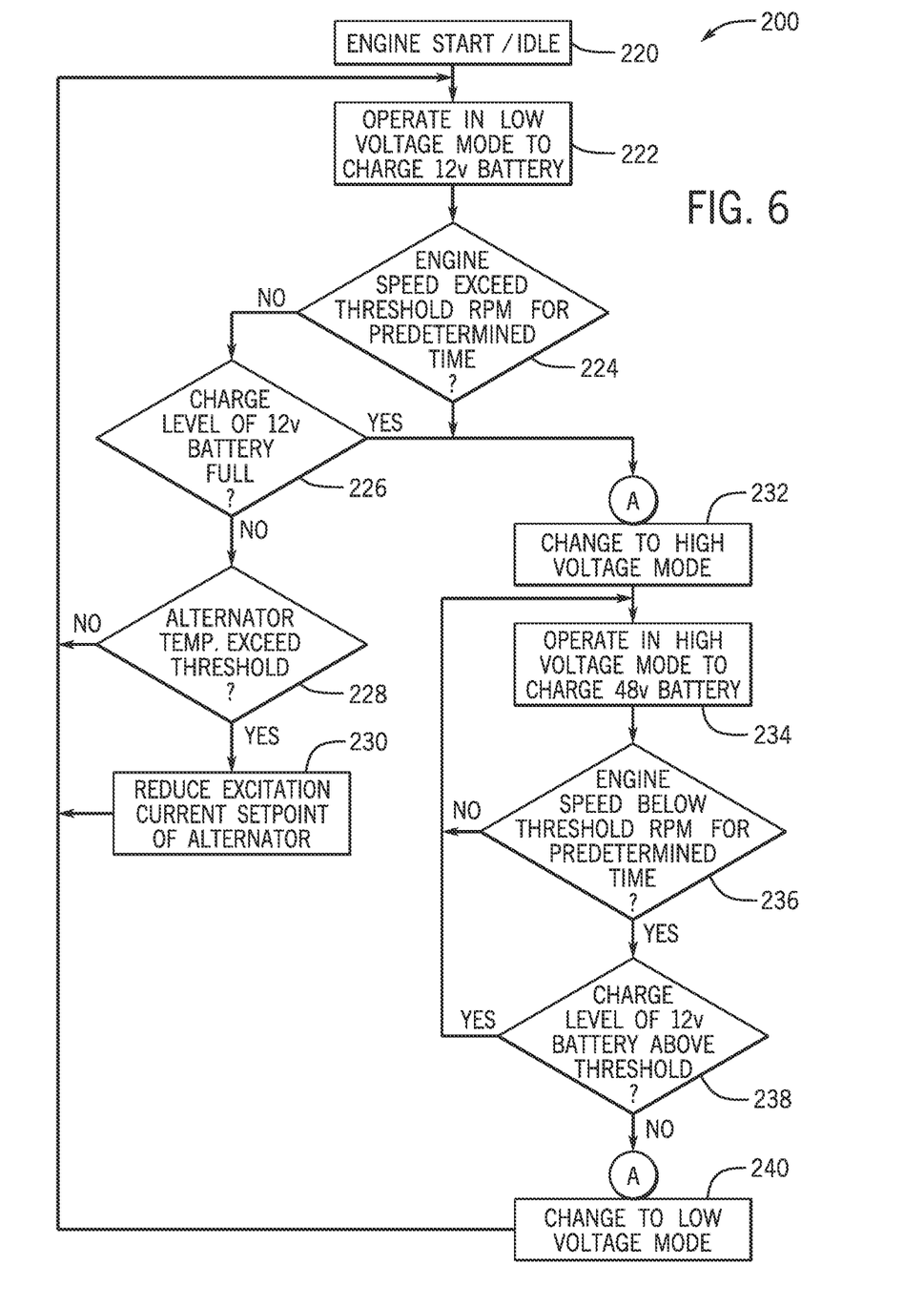
Figure 7:
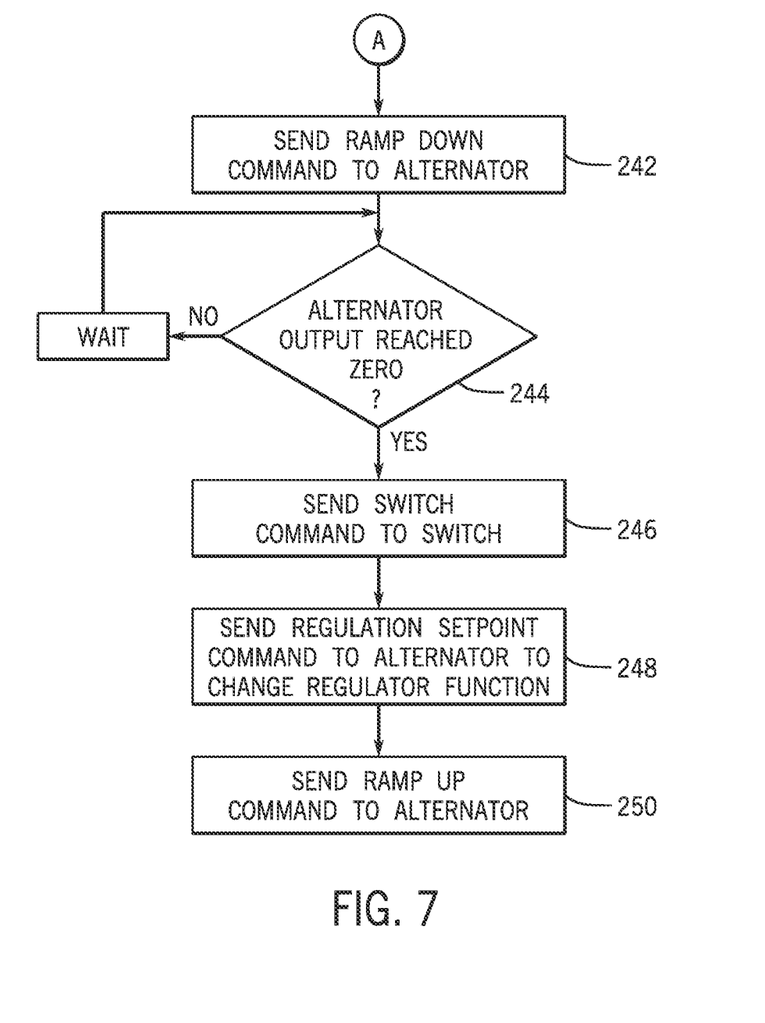

FIGS. 5-7 depict embodiments of methods 200 of controlling a variable voltage charging system 100 on the vehicle. After engine start at step 202, the system 100 is operated in the low voltage mode 180 to charge the low voltage storage device 102. Upon detecting a high voltage mode condition at step 206, operation of the system is changed at step 208 so as to operate in the high voltage mode 190. The high voltage mode condition may be defined based on one or more parameters, including engine RPM, alternator temperature, and/or charge level of one or more of the storage devices 102, 108. At the transition point 185, the operation of the alternator 116 and the switch 114 are transitioned. Exemplary steps for carrying out the transition are described below. When operated in the high voltage mode 190, the controller detects low voltage mode conditions at step 210. The low voltage mode condition for switching operation of the system 100 to the low voltage mode 180 may be based on engine RPM and/or charge level of the low voltage storage device 102, for example. Upon detection of the low voltage mode condition, the controller changes operation of the system 100, including transitioning the switch 114 and the alternator 116 to operate in the low voltage mode 180.

FIG. 6 depicts another embodiment of the method 200 of controlling the variable voltage charging system 100 on a vehicle. The engine is started at step 220 and operated at idle, which is typical engine operation at start. The charging system 100 is thus operated in the low voltage mode 180 to charge the low voltage storage device 102, which in the depicted examples is a 12 volt battery. Engine RPM, charge level, and alternator temperature are monitored to determine whether the high voltage mode condition has occurred. In the depicted example, instructions are executed at step 224 to determine whether engine speed has exceed a threshold RPM for a predetermined amount of time. Since transitioning between charging modes 180 and 190 significantly changes the load on the engine 104, it may be desirable to reduce the frequency and number of mode changes by requiring that the engine speed demonstrate consistency above or below the threshold before transitioning so that the user does not experience frequent changes in engine 104 performance. Thus, the transition from low voltage mode 180 to high voltage mode 190, and the reverse transition, may only be provided if the engine 104 is operated at a relatively consistent engine speed above or below the transition threshold, respectively.

If the engine speed does not exceed the threshold RPM at step 224, the controller 112 may further be configured to assess battery charge level and/or alternator temperature to consider whether to continue operation in the low voltage mode 180. Instructions are executed at step 226 to determine whether the charge level of the 12 volt battery indicates that transitioning to the high voltage mode 190 is appropriate. If the 12 volt battery is fully charged, then the controller 112 may be configured to transition to the high voltage mode 190, such as to avoid risk of overheating the alternator 116 by continuing operation in the low voltage mode 180. If the low voltage storage device 102 could use further charge, and thus continuing operation in the low voltage mode 180 is beneficial, then instructions may be executed at step 228 to assess the temperature of the alternator 116. If the alternator temperature remains below the high temperature threshold a step 228, the system 100 may continue operation in the low voltage mode 180. On the other hand, if the alternator temperature exceeds the high temperature threshold at step 228, then the controller 112 may send a command to the alternator 116 to reduce the excitation current setpoint of the alternator 116 in order to reduce the current in the stator 136 and prevent over heating of the alternator 116.

If the engine speed exceeds the threshold RPM at step 224, then the controller 112 may instruct the alternator 116 and the switch 114 to transition to the high voltage mode functions at step 232. Exemplary steps for controlling the switch are those traded at FIG. 7. The system is then operated in the high voltage mode at step 234 to charge the high voltage storage device 108, which in the depicted examples is a 48 volt battery. Instructions are executed at step 236 to determine whether the engine is again being operated in the low speed range. If the engine speed is below the threshold RPM for a pre-determined time at step 236, then the controller 112 may assess whether the charge level of the low voltage storage device 102 justifies switching to the low voltage mode 180. For example, if the charge level of the 12 volt battery is above a charge threshold at step 238 indicating that the 12 volt battery is sufficiently charged, then the system 100 may continue to operate in the high voltage mode 190. However, if the engine speed remains below the threshold RPM and the low voltage storage device 102 is in need of charge, then the controller 112 may instruct a change in the operation of the alternator 116 and the switch 114 in order to change to the low voltage mode 180 at step 240.

FIG. 7 depicts exemplary steps for switching between modes 180 and 190. Since the transition will enact a noticeable change on the load exerted on the engine 104, the controller 112 may be configured to execute transition procedures that slowly ramp down the draw by the alternator prior to the switch and then slowly ramp the alternator output back up so that the operator does not notice sudden changes in engine mode. Additionally, ramping down the charge output by the alternator to zero or a very low output will put less stress on the switch 114, and thus prolong the life of the switch. The controller 112 may be configured to send a ramp down command to the alternator 116 via the communication link 172. For example, the controller 112 may send a LIN command to the LIN terminal 170 of the voltage regulator 176 that commands the voltage regulator 176 to effectuate a decrease in charge output by the alternator 116 at a particular rate of change i.e., a ramp down rate. For example, the voltage regulator 176 may be commanded to decrease the charge output to zero output at the commanded ramp down rate. The ramp down rate is sufficiently slow so that the operator does not notice a sudden or drastic change in engine performance.

Once the alternator output reaches zero or some preconfigured minimal output, at step 244, then the controller 112 may command the switch 114 to change positions at step 246. In certain embodiments, the communication link 173 between the controller 112 and the switch 114 may be by different means than the communication link 172 between the controller 112 and the alternator 116. For example, the communication link 173 to the switch 114 may be via a CAN bus or some other serial communication bus, or alternatively may be a direct and dedicated connection for communicating between the controller and the switch 114, such as a wire connected to ground inside the controller 112. If the system 100 is in the low voltage mode 180 and a high voltage mode condition is detected, then the switch 114 will be commanded to change from the low voltage switch position 114a to the high voltage switch position 114b. Conversely, if the system 100 is operating in the high voltage mode 190 and a low voltage mode condition is satisfied then the switch 114 is commanded to change to the low voltage position 114a.

The controller 112 also sends a corresponding regulation setpoint command to the alternator at step 248. The regulation setpoint command commands the voltage regulator 176 to change its maximum voltage output as appropriate for the charge mode 180, 190. If transitioning to the high voltage mode 190, then the commanded regulation setpoint will provide a voltage output appropriate for the high voltage load 120. For example, with a high voltage load 120 is a 48 volt battery, the regulation setpoint for the voltage regulator 176 may be a typical charge voltage for charging a 48 volt battery, such as a value in the range of 53 to 56 volts. If transitioning to the low voltage mode 180, then the regulation setpoint command will instruct the voltage regulator 176 to provide a charging output that is appropriate for the low voltage storage device 102. Where the low voltage storage device 102 is a 12 volt battery, the regulation setpoint will provide an appropriate charge voltage that is standard for charging a 12 volt battery (e.g., a value in the range of 14 to 14.5 volts). Once the regulation setpoint of the alternator 116 has been changed, then the controller commands the alternator at step 250 to ramp its output up to the new setpoint.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

I claim:

1. A charging system for a vehicle, the system comprising:
   an alternator configured to generate electric power from a rotation output of an engine, wherein the alternator is configured to alternately output at least a low charge voltage to charge a low voltage storage device and a high charge voltage to charge a high voltage storage device;
   a switch configured to switch between at least a first switch position connecting the alternator to the low voltage storage device and a second switch position connecting the alternator to the high voltage storage device; and
   a controller configured to control operation of the alternator and the switch between at least a low voltage mode and a high voltage mode based on at least one of an engine RPM of the engine and a temperature so as to switch from the low voltage mode to the high voltage mode when the engine RPM increases and to switch from the high voltage mode to the low voltage mode when engine RPM decreases, wherein in the low voltage mode the alternator outputs the low charge voltage and the switch is in the first switch position and in the high voltage mode the alternator outputs the high charge voltage and the switch is in the second switch position.

2. The system of claim 1, wherein the high voltage storage device is a 48 volt battery and the low voltage storage device is a 12 volt battery, wherein the 12 volt battery powers a starter for the engine and the 48 volt battery powers a house load on the vehicle.

3. The system of claim 1, wherein the controller is configured to switch between the high voltage mode and the low voltage mode based on a comparison of the engine RPM to at least one threshold RPM.

4. The system of claim 3, wherein the controller is configured to switch to the high voltage mode from the low voltage mode when the engine RPM exceeds the threshold RPM for a predetermined time, wherein the controller is configured to switch to the low voltage mode from the high voltage mode when the engine RPM is less than the threshold RPM for a predetermined time.

5. The system of claim 3, wherein the controller is configured to operate the alternator and the switch in the low voltage mode when the engine RPM remains at idle and to operate the alternator and the switch in the high voltage mode when the engine RPM remains above the threshold RPM.

6. The system of claim 3, wherein in the low voltage mode the controller is configured to reduce an excitation current of the alternator based on at least one of the engine RPM and the temperature such that the excitation current decreases as the engine RPM increases towards the threshold RPM and/or when the temperature exceeds a temperature threshold.

7. The system of claim 6, wherein in the low voltage mode the controller is configured to reduce the excitation current setpoint of the alternator based on the temperature to prevent overheating the alternator.

8. The system of claim 1, wherein the temperature is an alternator temperature and the controller is configured to switch between the high voltage mode and the low voltage mode based on the alternator temperature and a charge level of at least one of the low voltage storage device or the high voltage storage device, wherein the controller is configured to operate the alternator and the switch in the low voltage mode when the engine RPM is less than a threshold RPM, the charge level of the low voltage storage device is below a charge threshold and the alternator temperature does not exceed a high temperature threshold.

9. The system of claim 6, wherein the temperature is alternator temperature and wherein the temperature threshold is a first temperature threshold, further comprising a temperature sensor configured to sense the alternator temperature, wherein the controller is configured to switch from the low voltage mode to the high voltage mode if the alternator temperature exceeds a high temperature threshold, wherein the high temperature threshold is higher than the first temperature threshold.

10. The system of claim 1, wherein the controller is further configured to switch from the low voltage mode to the high voltage mode after a time limit for operation in the low voltage mode is exceeded, wherein the time limit is calibrated to prevent overheating the alternator.

11. A method of controlling a variable voltage charging system on a vehicle, the variable voltage charging system comprising an alternator configured to alternately output at least a low charge voltage to charge a low voltage storage device and a high charge voltage to charge a high voltage storage device and a switch configured to switch between at least a first switch position connecting the alternator to the low voltage storage device and a second switch position connecting the alternator to the high voltage storage device, the method comprising:
  operating the alternator and the switch in a low voltage mode to charge the low voltage storage device, wherein the alternator outputs the low charge voltage and the switch is in the first position;
  identifying a high voltage mode condition based on at least one of an engine RPM increase and a temperature increase and then:
    changing the switch from the first switch position to the second switch position;
    changing a regulation setpoint of the alternator from a low voltage setpoint to a high voltage setpoint;
    operating the alternator and the switch in a high voltage mode wherein the alternator outputs the high charge voltage to charge the high voltage storage device;
  identifying a low voltage mode condition based on at least one of an engine RPM decrease and a temperature decrease and then:
    changing the switch from the second switch position to the first switch position;
    changing the regulation setpoint of the alternator from the high voltage setpoint to the low voltage setpoint; and
    operating the alternator and the switch in a low voltage mode wherein the alternator outputs the low charge voltage to charge the low voltage storage device.

12. The method of claim 11, wherein identification of the high voltage mode condition includes identifying that the engine RPM is above a threshold RPM.

13. The method of claim 11, wherein the temperature is an alternator temperature and identification of the high voltage mode condition is based on the alternator temperature and a charge level of at least one of the low voltage storage device and the high voltage storage device.

14. The method of claim 11, wherein identification of the high voltage mode condition includes identifying that the temperature exceeds a high temperature threshold.

15. The method of claim 11, wherein identification of the low voltage mode condition includes identifying that a charge level of the low voltage storage device is below a charge threshold and that the engine RPM is less than a threshold RPM.

16. The method of claim 11, wherein identification of the low voltage mode condition includes determining that the temperature does not exceed a high temperature threshold.

17. The method of claim 11, wherein identification of the low voltage mode condition includes identifying that an engine RPM is below a threshold RPM for a predetermined time.

18. The system of claim 3, wherein the controller is further configured to determine the threshold RPM based on the temperature such that the threshold RPM decreases when the temperature exceeds a temperature threshold.

19. The system of claim 6, wherein in the low voltage mode the controller is configured to reduce the excitation current of the alternator based on the engine RPM such that the excitation current decreases when the engine RPM exceeds a first threshold RPM, wherein the first threshold RPM is less than the threshold RPM for switching between the low voltage mode and the high voltage mode.

20. The system of claim 12, further comprising determining the threshold RPM based on the temperature such that the threshold RPM decreases when the temperature exceeds a temperature threshold.

21. The system of claim 12, further comprising in the low voltage mode, reducing an excitation current of the alternator based on at least one of the engine RPM and the temperature such that the excitation current decreases as the engine RPM increases towards the threshold RPM and/or when the temperature exceeds a temperature threshold.

* * * * *